March 30, 1943. M. B. DE BENGOA 2,314,925
PORTABLE THERMOGRAPH
Filed Oct. 24, 1939

Inventor:
MIGUEL BECERRO DE BENGOA
By Richards & Geier
Attorneys

Patented Mar. 30, 1943

2,314,925

UNITED STATES PATENT OFFICE 2,314,925

PORTABLE THERMOGRAPH

Miguel Becerro de Bengoa, Montevideo, Uruguay

Application October 24, 1939, Serial No. 301,001

2 Claims. (Cl. 73—368)

This invention relates to a portable thermograph.

An object of the invention is the provision of a device by means of which it is possible to record temperatures graphically and continuously.

Another object is the provision of a portable thermograph which may have the dimensions of an ordinary watch, which is inexpensive to manufacture and which is simple and effective in operation.

Other objects of the present invention will become apparent from the following specification.

A portable thermograph is illustrated by way of example in the attached drawing in which.

The thermograph consists of the following three principal elements:

1. A thermometer of general use CB (Fig. 1) which can be cylindrical or with parallel faces and which should be transparent so that the light can go through, without deflection or refractions, and having a mercury-column or other substance which does not allow the light to pass through.

2. A luminous source H (Fig. 1).

3. A surface D sensitive to the light and used as a carrier of the diagram of the temperature plotted by means of the light on the sensitive surface which is located behind the thermometer.

On the wall J the luminous source is situated, which may be an electrical wire-filament, luminous paint or any other system capable of producing light. Close to and parallel with this line of light the body of the thermometer CB (Figs. 1, 4 and 5) is situated. A diaphragm A with a slot follows, which is also parallel to the luminous source and the thermometer and which is designated to protect the sensitive surface D. Through the slot the light passes, which after having passed through the thermometer reaches the sensitive surface D and makes impressions thereon (Figs. 1, 2, 3, 4 and 5).

Figure 1:
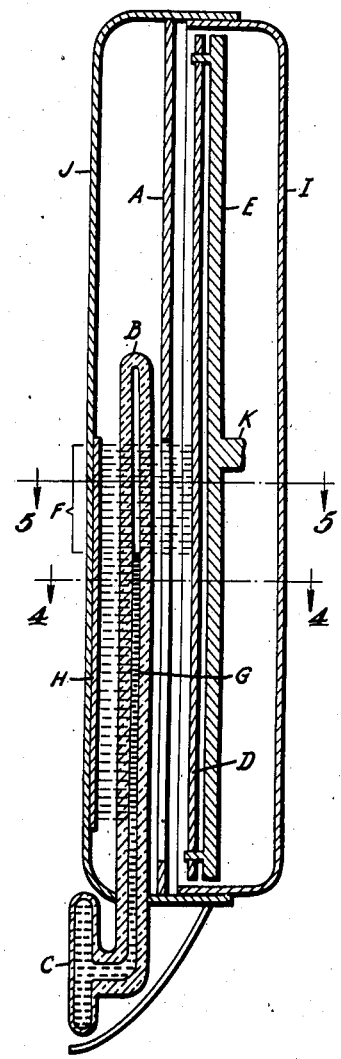
Figure 1 is a transverse section in which is shown the walls J and I of the apparatus; the luminous source H; a diaphragm A; the thermometer CB; the sensitive surface D and the rotating plate E. The clock-work apparatus (not shown) is located between the plate E and the wall I.
Figure 2:
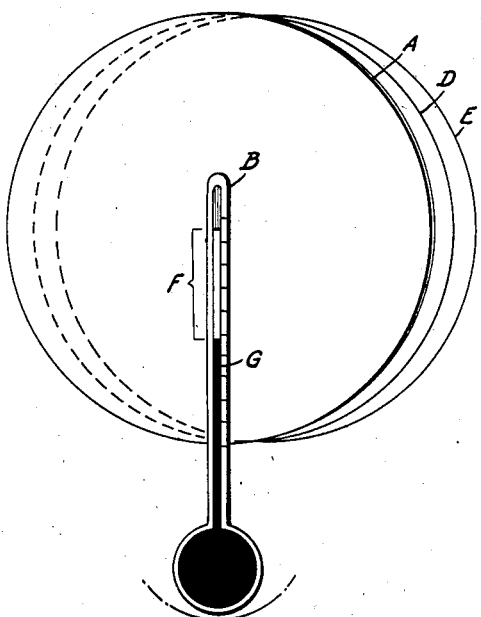
Figure 2 is a diagrammatic view of the invention.
Figure 3:
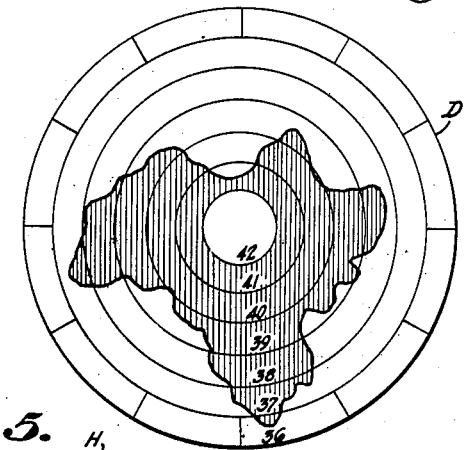
Figure 3 shows an example of a complete diagram in a cycle, the sensitive surface D with 12 hour-spaces and the scale of temperatures.
Figure 4:
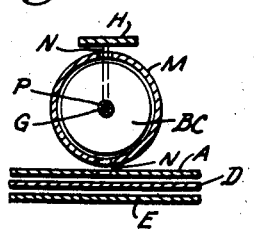
Figure 4 is a section along the line 4—4 of Fig. 1, showing by dotted lines the light coming from the luminous source H and retained by the mercury-column G.
Figure 5:
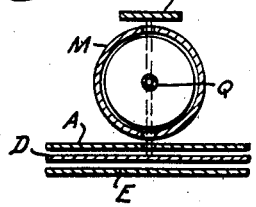
Figure 5 is a section along the line 5—5 of Fig. 1 and shows how the luminous lines of the source H reach the sensitive surface D, due to the fact that the thermometric column G is not interposed.

The thermometer is surrounded or covered by a metallic sheath or other opaque substance M (Figs. 4 and 5) having a slot N (Fig. 4) extending longitudinally on both sides, said slot being narrower than the mercury column and designated to let the light through a space corresponding to the mercury column G, which closes when the mercury rises by the effect of the temperature (Fig. 4) and opens when it falls, as shown at Q (Fig. 5) and F (Fig. 1). In this manner the deflection or dispersion of the light is avoided even if the thermometer is a cylindrical one. The sensitive surface D is blackened solely by the passage of the light through the space F (Fig. 1) which is variable depending upon the height of the column G resulting from the effect of the temperature. Variations of that height are recorded in the different quadrants or divisions, which rotate by means of a clock-work (not shown) which revolves a plate E or a similar system, and is situated between the plate E and the wall I. This sensitive surface D (which can be a disc as is shown in Fig. 4) is fastened to the plate E which can rotate continuously or alternately tracing a continuous diagram or a discontinued one every 10 or 15 minutes. If the light were discontinued during a lapse of time, on the sensitive plate would be registered a radius the length of which would be limited by the height of the column G.

The half I of the apparatus is made of a separate piece from the other half J, in order to have access to the film or sensitive surface D; the half I contains the mechanical part and the part J the optical system. The application of the apparatus to the body of a person is effected by any suitable means in such a way that the bulb C of the thermometer is applied directly to the armpit or any other part of the body.

What I claim is:

1. A portable thermograph comprising a protective casing consisting of a plurality of removably interconnected supporting parts, a light sensitive disc dial within said casing, means carried by one of said supporting parts and connected with said disc dial for rotating the same in clockwise fashion, a source of light rays directed toward said disc dial and carried within said casing by another one of said supporting parts, a diaphragm situated within said casing and having a slot located in the path of said light rays, and a thermometer having an opaque column situated within the path of said light rays, an opaque sheath surrounding the thermometer and having diametrically disposed slits alined in the path of the light rays, whereby the opaque column will obstruct said light below the meniscus thereof from reaching the disc dial while the light rays above the meniscus reach the disc dial to indicate the position of the opaque column.

2. A portable thermograph comprising a protective casing consisting of a plurality of removably interconnected supporting parts, a light-sensitive disc dial within said casing, means carried by one of said supporting parts and connected with said disc dial for rotating the same in clockwise fashion, a source of light rays directed toward said disc dial and carried within said casing by another one of said supporting parts, a diaphragm situated within said casing and having an axial slot located in the path of said light rays, and a thermometer having a casing carried by one of said supporting parts and including opaque portions and light-transmitting portions situated at least partly in the path of said light rays and comprising diametrically disposed slots extending parallel to the axial slot of the diaphragm, the slots of the thermometer casing being less wide than the opaque column, the level of said column being situated within the path of said light rays, whereby indicia inscribed by the light rays upon said light-sensitive disc dial indicate positions of said opaque column.

MIGUEL BECERRO de BENGOA.